E. A. LONGENECKER.
FILM WINDING APPARATUS FOR MOTION PICTURE MACHINES.
APPLICATION FILED MAR. 3, 1915.

1,242,006.

Patented Oct. 2, 1917.
3 SHEETS—SHEET 1.

Witnesses
Frederick L. Fox.
H. P. Hoster

Inventor
Ernst A. Longenecker
By Victor J. Evans.
Attorney

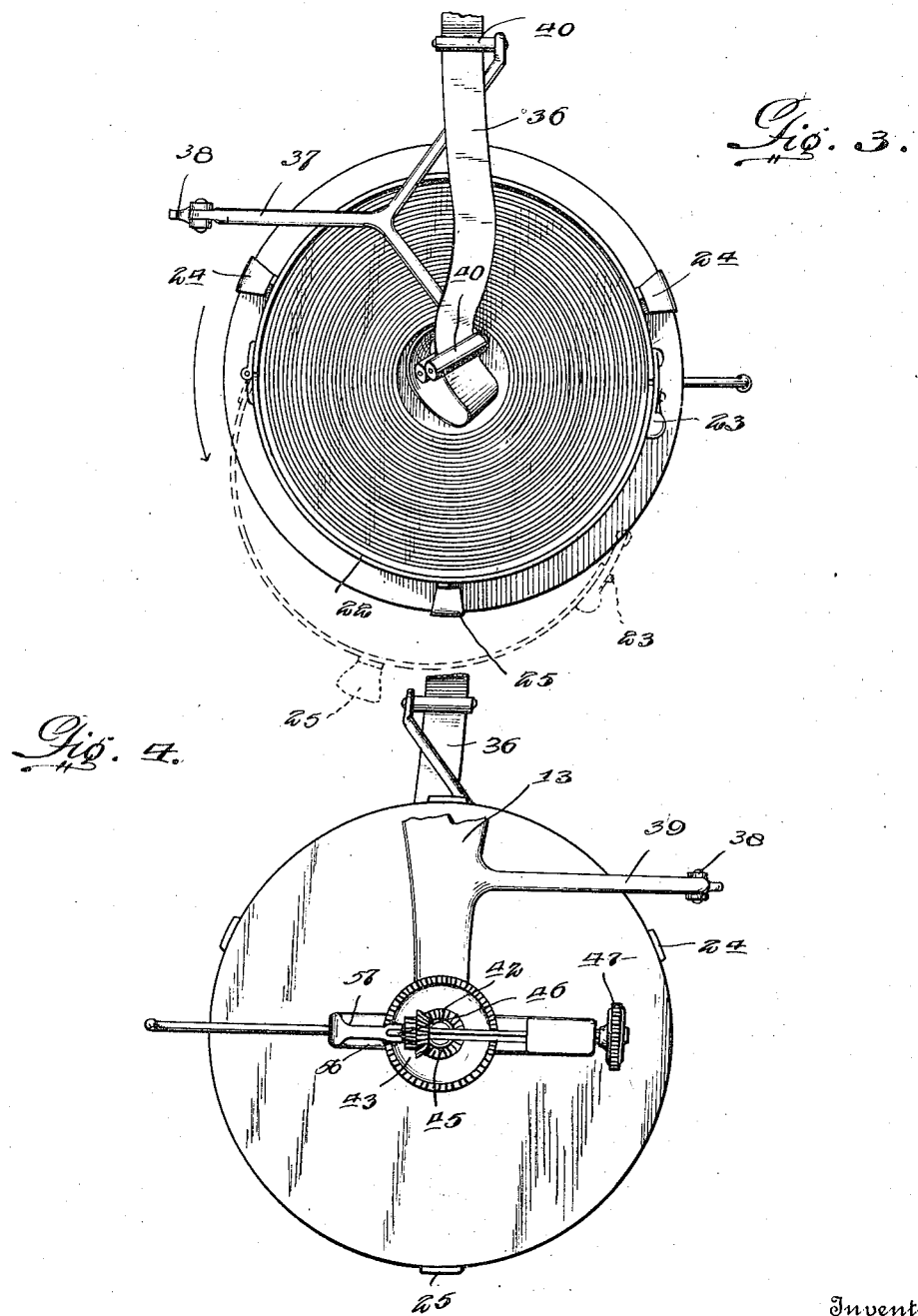

E. A. LONGENECKER.
FILM WINDING APPARATUS FOR MOTION PICTURE MACHINES.
APPLICATION FILED MAR. 3, 1915.
1,242,006.
Patented Oct. 2, 1917.
3 SHEETS—SHEET 3.
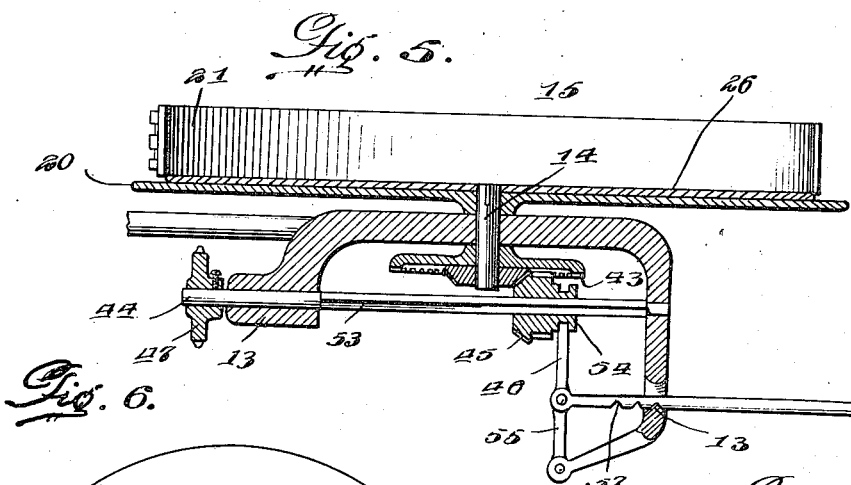
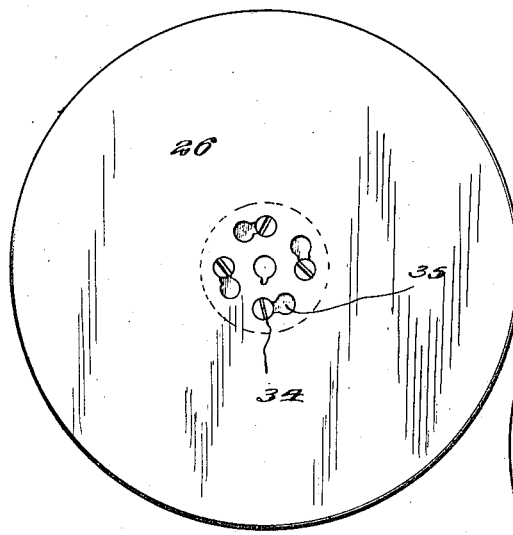
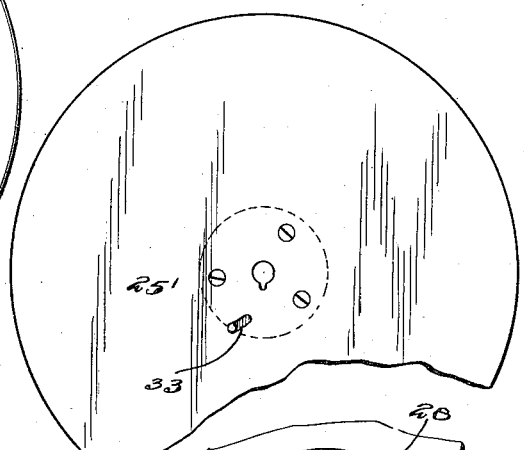
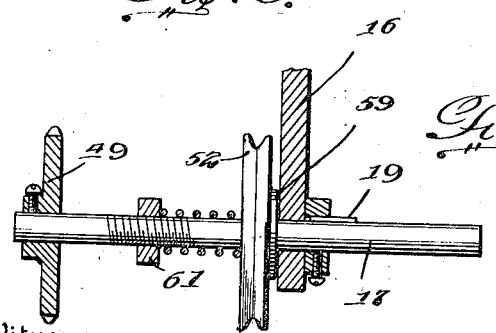
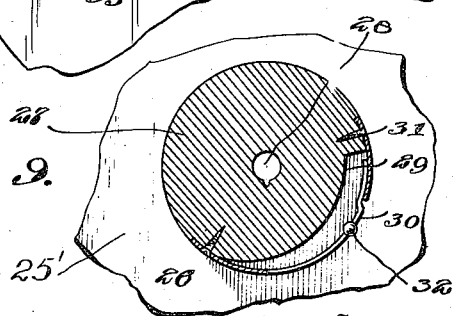
Inventor
Ernst A. Longenecker.
Witnesses
Frederick L. Fox.
By Victor J. Evans.
Attorney

UNITED STATES PATENT OFFICE.

ERNST A. LONGENECKER, OF VIOLA, WISCONSIN.

FILM-WINDING APPARATUS FOR MOTION-PICTURE MACHINES.

1,242,006.         Specification of Letters Patent.         Patented Oct. 2, 1917.

Application filed March 3, 1915. Serial No. 11,847.

*To all whom it may concern:*

Be it known that I, ERNST A. LONGE-NECKER, a citizen of the United States, residing at Viola, in the county of Richland and State of Wisconsin, have invented new and useful Improvements in Film-Winding Apparatus for Motion-Picture Machines, of which the following is a specification.

The invention relates to motion picture machines, and has for an object to provide a film winding apparatus therefor, in which the usual film can be reëxhibited in the machine without first rewinding the same.

The invention contemplates, among other features, the provision of a film winding apparatus which is adapted to accommodate the usual primary and secondary reels, the film being initially carried on the primary and adapted to be wound upon the secondary reel, after being exhibited, and whereby, when the film is reëxhibited, the film need not be first rewound but need only be transferred to the position usually occupied by the primary reel and then advanced through the machine in the usual manner.

The invention further contemplates the provision of a film winding apparatus which, when the old style reel containing the film is used therewith, permits of winding the film on to the form of reel I preferably use with the machine, thus dispensing with the rewinding operation and which, with the old style reel, is a necessary operation.

In the further disclosure of the invention reference is to be had to the accompanying drawings, constituting a part of this specification, in which similar characters of reference denote corresponding parts in all the views, and in which:

Fig. 3 is a plan view of the primary reel and guiding mechanism for the film, the dotted lines indicating the partially open position of the closure for the reel pan;

Fig. 4 is a bottom plan view of the reel and structure shown in Fig. 3;

Fig. 5 is a vertical sectional view through the reel pan and associated mechanism, taken on the line 5—5 in Fig. 1;

Fig. 6 is a bottom plan view of the reel;

Fig. 7 is a top fragmentary plan view of the reel;

Fig. 8 is a fragmentary enlarged vertical sectional view taken through the take-up mechanism for the secondary reel; and Fig. 9 is a fragmentary plan view looking at the inside of the bottom of the reel, parts being shown in section.

Figure 1:
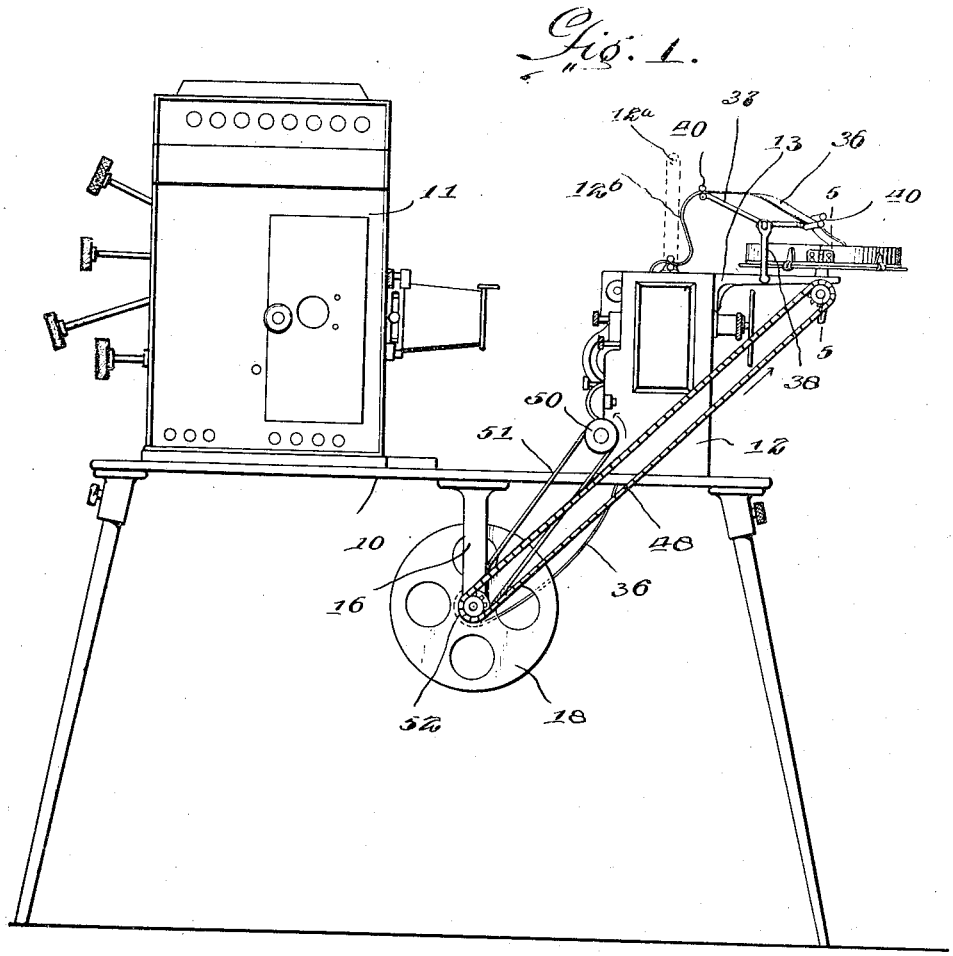
Figure 1 is a side elevation of the machine.

Referring more particularly to the views, I disclose the usual table 10 carrying a lamp 11 and the usual projecting apparatus 12. A bracket 13 projects from the apparatus 12 and journaled therein is a vertical shaft 14 carrying a reel pan 15. Depending from the under side of the table 10 is a hanger 16 in which is journaled a horizontal shaft or spindle 17 for the secondary reel 18, and which may be either the primary or secondary reel, depending upon its position on the machine, said reel 18 being keyed against rotation upon the shaft by a suitable key 19, shown in Fig. 8.

The reel pan 15 comprises a bottom 20 and a curved side 21 having a substantially curved closure 22 mounted to swing thereon and adapted to complete the side when the closure is secured by a catch 23, as clearly shown in Figs. 3 and 5, the side 21 being held and supported upon the bottom by securing members 24, with a similar member 25 carried by the closure 22, acts to limit the inward movement of said closure.

The reel shown in detail in Figs. 6, 7 and 9 consists of an upper section 25' and a lower section 26, the upper section 25' having a central hub 27 provided with an opening 28 formed so that the projecting end of the spindle 17 will readily pass through the hub, said hub furthermore having a cut away portion 29, with a spring-like locking member 30 having one end secured to the hub and the other end adapted to lie against a plate 31 upon the hub and bordering one end of the cut away portion, said locking member 30 carrying a knob 32 projecting through a slot 33 in the upper section 25'. Projecting from the under side of the hub 27 are a series of fastening or locking elements 34 which pass through bayonet slots 35 in the lower section 26 and serve to hold the upper and lower sections together, it being readily seen that the bayonet slots are made sufficiently large to permit of passing the lower ends of the locking elements therethrough and then by slightly turning one section relatively to the other the locking elements will be advanced into the restricted portions of the bayonet slots to hold the sections against relative displacement.

Figure 2:
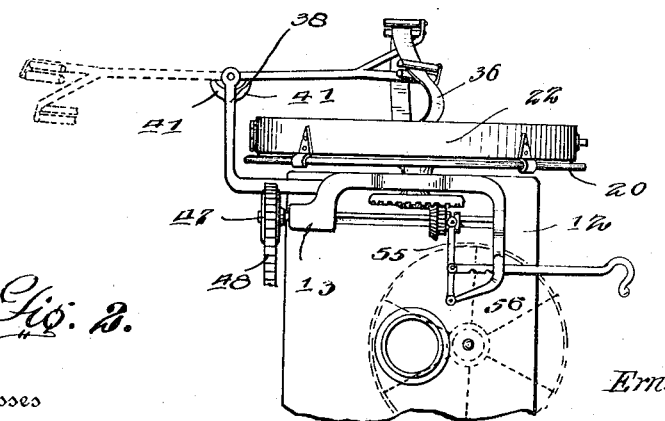
Fig. 2 is a fragmentary enlarged front elevation, the dotted lines indicating the inactive position of the guiding member.

When a film 36 is initially wound upon the reel, the end of the film containing the title or first picture is secured between the locking member 30 and the plate 31 shown in Fig. 9, and the body of the film is wound around the hub 27, the sections being relatively connected through the medium of the elements 34, it being understood that when the reel is used in this manner the same is mounted upon the spindle 17 and which, when subsequently rotated, will wind the film around the hub, with the inner or first end of the film secured between the member 30 and plate 31. When it is desired to exhibit the film the reel, and which is now the secondary reel, upon the spindle 17, is bodily removed from the spindle and placed in the reel pan 15, the closure 22 of which is open in order that the reel can be slid into the reel pan, said reel now becoming the primary reel. After this has been done a slight turning movement imparted to the upper section 25' while at the same time a pressure is exerted on the knob 32, will result in loosening the locking elements 34 in the slots 35 and in loosening the first end of the film from its clamped engagement between the locking member 30 and the plate 31 so that when the upper section 25' is withdrawn upwardly from the reel pan, it will leave the lower section therein as shown in Fig. 5, with the film lying upon the lower section and remaining in the reel pan. The closure 22 is now secured by the catch 23 and the first or initial end of the film, and which will lie within the body of the film, having been removed from engagement with the hub 27, is now pulled outwardly and upwardly to pass through a guide member 37 suitably mounted to swing upon an upright 38 on an extension 39 of the bracket 13, said guide member 37 carrying suitable rollers or guides 40, through which the film is passed, as shown in Figs. 1, 2 and 3, it being clearly seen by reference to Fig. 2 that the guide member 37 can be swung into an inactive position as shown in dotted lines in Fig. 2 and that the guide member, whether in active or inactive position, lies substantially horizontal and has its swinging movement limited by a plurality of apposed stop members 41 upon the upright 38. The film is now threaded through the apparatus 12 and then passes downwardly to have its first or initial end secured between the locking member 30 and plate 31 of a second or duplicate reel arranged upon the spindle 17 and which is thus termed the secondary reel on account of its position upon the spindle. Thus it will be seen that the film when unwound from the primary reel is unwound from the inner end or center and is wound around the hub 27 of the secondary reel and said secondary reel being subsequently transferred to the reel pan to become the primary reel, with the former primary reel transferred to the spindle 17 to become the secondary reel. The shaft 14 carrying the reel pan 15 carries on its lower end a toothed wheel 42 and a second and larger toothed wheel 43. Journaled in the bracket 13 is a shaft 44 carrying a toothed wheel 45 and a second toothed wheel 46, said shaft 44 on its outer end furthermore carrying a toothed wheel 47, over which operates a continuous chain 48 passing over a toothed wheel 49 keyed to the outer end of the spindle 17. A pulley 50 is suitably connected in any desired manner with the projecting apparatus 12, whereby said pulley will be rotated when the apparatus is actuated to receive the film and advance the same through the machine, a suitable belt 51 passing over the pulley 50 and over a pulley 52 upon the spindle 17. Thus it will be seen that when the apparatus is actuated to advance the film therethrough and exhibit the same, rotation will be imparted to the spindle 17 and thus through the medium of the chain 48 rotation will be imparted to the reel pan 15, the toothed wheels 42 and 45 intermeshing for this purpose so that the film will be unwound or released from the reel pan at the same ratio of speed that it is wound upon the secondary reel 18, said film, however, being first passed through the projecting apparatus.

Now it will be clearly seen that the rotation of the primary and secondary reels by means of the connection existing therebetween will result in an effective unwinding of the film from the primary reel and a winding up of the film upon the secondary reel. If it should happen, however, that the operator in the first exhibit of a film receives the same upon an old style reel, it will be necessary to correspondingly change the connection between the primary and secondary reels if it is desired to wind the film upon my form of reel on the spindle 17. To this end the toothed wheels 45 and 46 are mounted to slide upon a squared portion 53 of the shaft 44 and the toothed wheel 46 includes a grooved head 54, in the groove of which operates a clutch member 55 pivoted to swing upon the bracket 13 and in pivotal connection with an operating lever 56 provided with a series of notches 57, into which extend a projection 58 formed on the bracket 13 to hold the operating lever 56 in a locked position. Now when the machine shown in Fig. 1 is being wound with the reel described herein, both as the primary and secondary reels, the operating lever 56 is so arranged that the toothed wheels 42 and 45 will intermesh to control the desired connection between the spindle 17 and the reel pan 15 whereby the winding up process on the secondary reel will be proportionate to the unwinding of the film from the primary reel in the reel pan. If, however, it is desired to use the old style or known reel, the known style of reel bearing the film and which has been rewound thereon, is placed upon a horizontal spindle 12ª on an upright 12ᵇ supported on the uprights 12 and the film is fed through the machine without coming in contact with the primary reel pan 22 to be received upon the new style of reel I have described herein placed on the spindle 17. It will be noted that the reel pan need not be made to revolve during this operation, as mentioned, and, therefore, the lever 56 is operated so that the projection 13 will extend into the middle notch of the lever and which will move the toothed wheel 40 out of mesh with the toothed wheel 42 so that the toothed wheels 45 and 46 will be entirely disengaged or out of mesh with the toothed wheels 42 and 43 to prevent rotation of the primary reel pan. With this arrangement the film is fed and operated through the machine in the usual manner and will be wound up upon the new style reel upon the spindle 17. When the film has been unwound from the old style reel on to my form of reel, and is subsequently to be reëxhibited the old style reel can be discarded and my reel which was the secondary reel will become the primary reel upon being placed in the reel pan, a duplicate being placed upon the spindle 17 to constitute the secondary reel. When this has been done the operating lever 56 is actuated to again intermesh the toothed wheels 42 and 45 and the operation described heretofore then takes place to unwind the film from the primary reel and wind the same upon the secondary reel, the unwinding of the film from the primary being accomplished by unwinding the film from the center of the primary reel and winding it up upon the center of the secondary reel, thereby obviating the necessity of rewinding the film before it can be exhibited.

In the last exhibition of the film, however, the operator probably will desire to return the film back on to the old style reel on which it was originally received. Now noting that the reel center of the reel I have described herein is of greater diameter than the reel centers of the old style reels, and that the speed of the secondary reel is controlled by the speed of the primary reel, it will be apparent that change in the speed of the transmission mechanism between the primary and secondary reels must be insured in order to effect a proper rewinding on to the old style reel. Therefore, the reel pan carrying the primary reel must rotate at a slower speed and to this end the lever 56 is moved to have the projection 13 extend into the notch 57, thus meshing the toothed wheel 46 with the larger toothed wheel 43. The unwinding operation of the film from the new style reel in the primary reel pan is now carried out, with the film adapted to be wound upon the old style reel on the spindle 17.

In order to insure a proper rotation of the spindle 17 and which derives its rotation through the medium of the belt 51 passing over the pulleys 50 and 52, I provide a take-up device upon the spindle and whereby the rotation of the spindle can be increased or decreased due to the provision of a friction take-up and which, operating upon the pulley 52, increases or decreases its rotation, thus effecting the rotation of the spindle 17. To this end there is secured upon the spindle 17 a friction disk 59, a suitable expansible helical spring 60 being arranged to encircle the spindle 17 and bearing against the other face of the pulley 52, with a nut 61 threaded upon the spindle and bearing against an end of the spring to increase or decrease the pressure of the spring against the pulley, thus increasing or decreasing the frictional contact of the pulley with the friction disk 59 and whereby it will be seen that the rotation of the pulley and the consequent rotation of the spindle can be adjusted to the desired degree by the operator.

With a device of the character described it will be seen that with my form of reel and its peculiar application to the machine the rewinding of the film is dispensed with, thus greatly reducing the wear upon the film for the reason that the rewinding operation of the film subjects the same to great wear and materially lessens the life of the film. With my structure the rewinding operation is entirely dispensed with if the primary reel be of the kind I have shown in detail. If the films be sent on the old style reel it will thus be seen that the film has to be rewound but once, that is, before the film is exhibited for the first time. It will be clearly seen that my form of reel can be cheaply manufactured; consists of few and simple parts and can be readily and quickly handled to accomplish the desired result.

Having thus described my invention, I claim:

1. The combination with a moving picture machine, of a rotatable reel supporting element, said element comprising a base, a curved side, angular members secured to said side and base, a horizontally hinged closure for said side, other angular members for said hinged closure and a catch for securing the said closure to the side.

2. The combination with a moving picture machine, of a rotatable reel supporting element, said element comprising a base, a circular reel receiving sectional flange supported upon said base, said flange being of smaller diameter than the base, one section of the flange being permanently secured to said base, while the other section is hinged to the first mentioned section to provide a horizontally movable closure, a stop carried by said closure and adapted to contact with the upper face and edge of the base and a securing member for said closure.

In testimony whereof I affix my signature in presence of two witnesses.

ERNST A. LONGENECKER.

Witnesses:
GARRETT DECKERT,
ROSE E. LONGENECKER.